Jan. 25, 1966  D. C. T. WALKER  3,230,753
EXTRUSION PULLER
Filed April 8, 1963  3 Sheets-Sheet 2
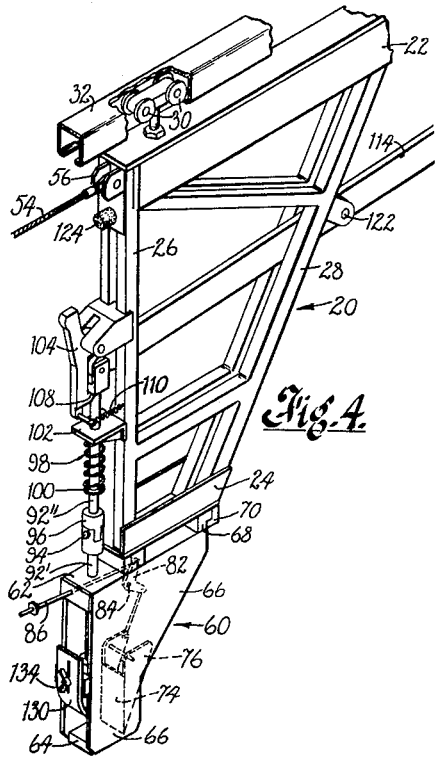
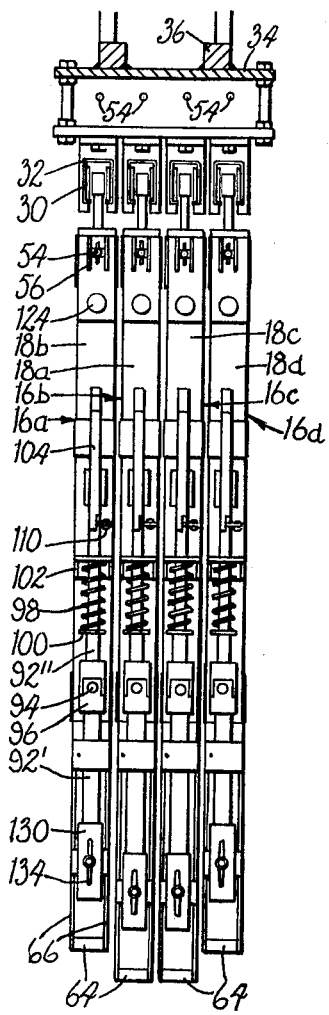
INVENTOR
DOUGLAS CHARLES TRURAN WALKER
BY
ATTORNEYS Jan. 25, 1966   D. C. T. WALKER   3,230,753
EXTRUSION PULLER
Filed April 8, 1963   3 Sheets-Sheet 3
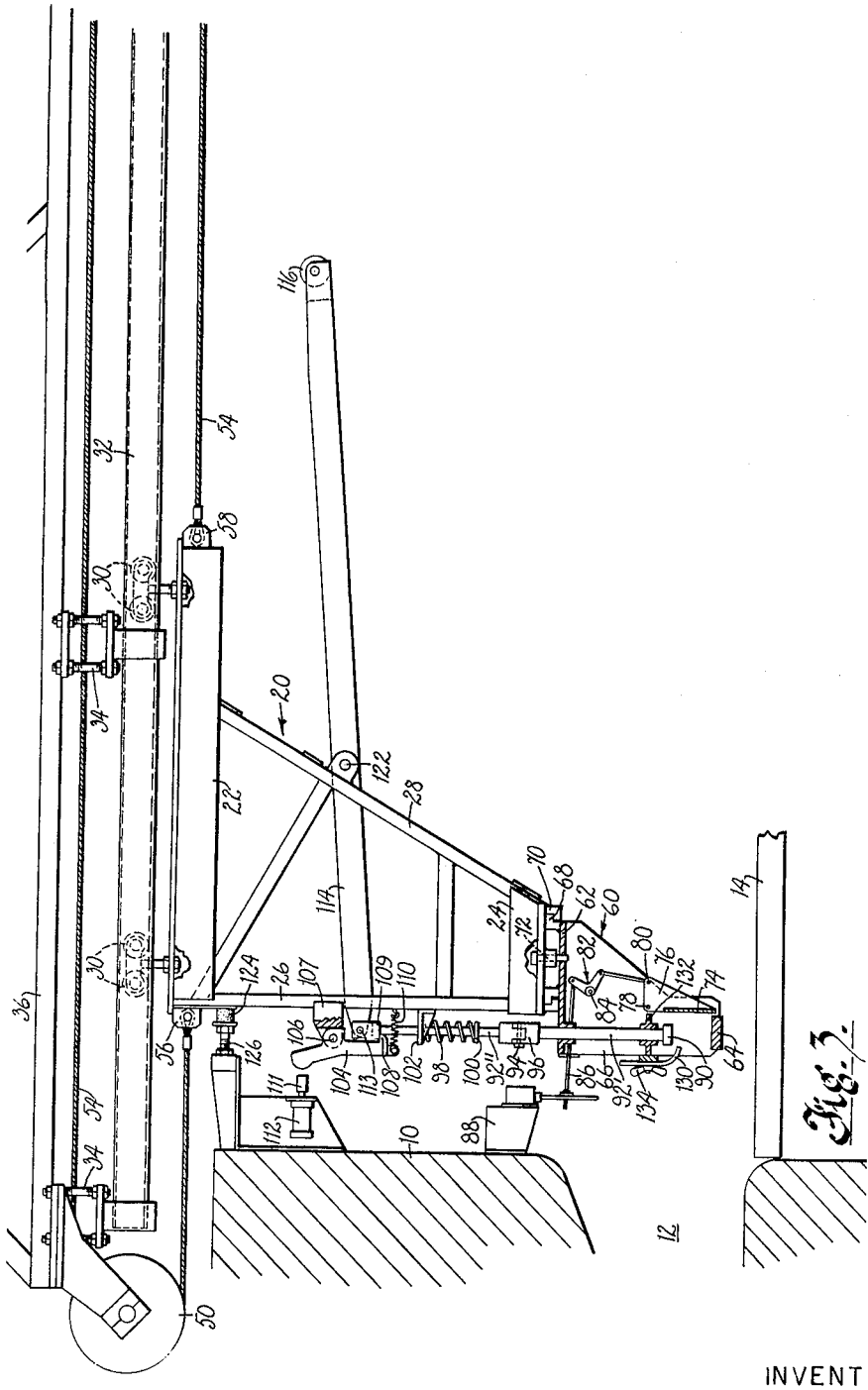
INVENTOR
DOUGLAS CHARLES TRURAN WALKER
BY
ATTORNEYS A# United States Patent Office 3,230,753
Patented Jan. 25, 1966

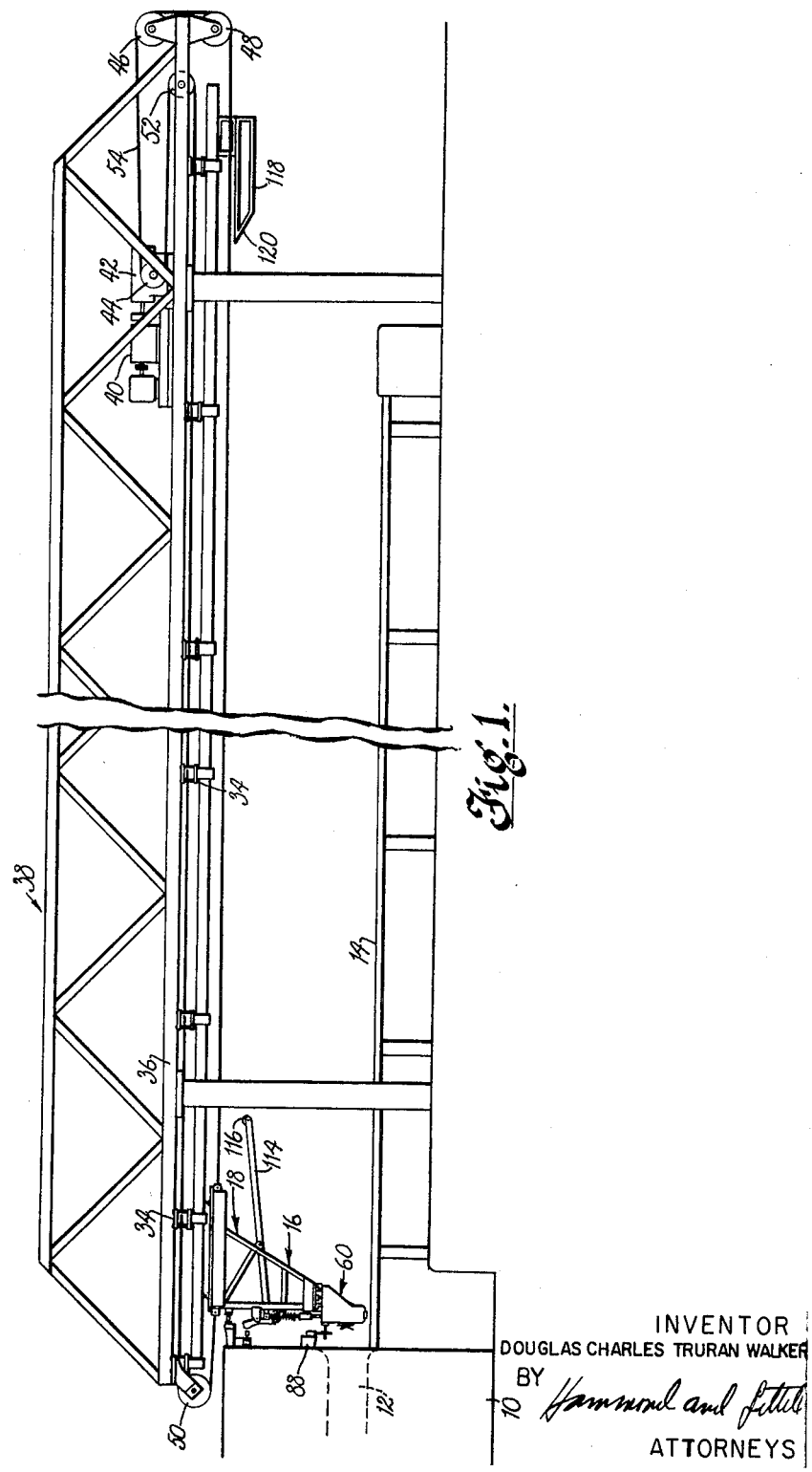

3,230,753
EXTRUSION PULLER
Douglas Charles Truran Walker, Broadstone, Dorset, England, assignor to The Loewy Engineering Company Limited, Bournemouth, England, a corporation of Great Britain
Filed Apr. 8, 1963, Ser. No. 271,439
Claims priority, application Great Britain, Apr. 6, 1962, 13,266/62
6 Claims. (Cl. 72—257)

The present invention relates to extrusion pullers for use with metal extrusion presses.

In an extrusion press, a metal billet is heated to a plastic state and forced through a die to form an article whose cross section corresponds to that of the die opening. On leaving the press the article is fed on to a run-out table extending from the die-supporting platen of the press. The article, as it emerges from the press, is still in a pliable condition and has to be guided along the table to prevent buckling. This is particularly necessary in the case of slender articles. Guiding of the extruded articles is also required in the case of multi-strand extrusion, in order to prevent individual strands from becoming entangled with each other.

An extrusion puller is, therefore, a device which grips automatically the leading end of an extruded article as it emerges from the press and, thereafter, guides the article along the run-out table. In the case of presses in which a number of strands are simultaneously extruded through the same die, an extrusion puller may comprise several gripper units, each adapted to grip one of a number of strands and to guide the strand along the run-out table independently of the other gripper units.

The object of the invention is to provide an extrusion puller having an improved mechanism for automatically gripping the leading end of an extruded article upon its emergence from the press.

According to the invention there is provided an extrusion puller comprising at least one power-driven carriage movable along the run-out table of an extrusion press, gripper means mounted on the carriage and adapted to grip an extruded article emerging from the die of the press, said gripper means being biased to move from an open position permitting passage of the leading end of the extruded article into an article-gripping position, a latch mounted on the carriage and arranged to hold the gripper means in the open position, latch-release means mounted on the press, and control means operable to actuate the latch-release means in response to insertion of the leading end of an extruded article into the gripper means.

When applied to a press in which plurality of strands are simultaneously extruded, an extrusion puller according to the invention comprises as many carriages, gripper means, latches, latch-release means and control means as there are strands.

A preferred construction of an extrusion puller according to the invention and arranged to guide four extruded articles emerging simultaneously from an extrusion press, will now be described by way of example with reference to the accompanying drawings.

FIG. 1 is a side elevation of an extrusion puller according to the invention, together with its run-out table and with a structure which supports its carriages and guides them along the run-out table.

FIG. 2 is an end elevation, at an enlarged scale, partly in section of the puller of FIG. 1 with its four gripper units, arranged side by side and supported and guided on the structure shown in FIG. 1.

FIG. 3 is a side elevation of the left hand end of FIG. 1 at the same scale as FIG. 2 with the gripper unit partly in section.

FIG. 4 is an isometric view of the gripper unit of FIG. 3.

In FIGS. 1 and 3, the platen 10 of an extrusion press is shown at the left hand end; the remainder of the press is not shown as it is immaterial for the present invention. The platen 10 has, as well known, a tunnel 12, from which the extruded articles emerge, to be received by a run-out table 14. In the present example, it is assumed that the press has a die with four openings and that accordingly four parallel strands of extruded articles leave the press simultaneously. As a strand emerges from the press tunnel 12, it is gripped at its leading end by one of four gripper units 16a, b, c or d and guided along the run-out table 14 by that particular unit, in order to prevent buckling and entanglement of the strands. The four gripper units 16a, b, c and d are identical with each other and it is, therefore, sufficient to describe only one of them. Each gripper unit is detachably mounted on one of four carriages 18a, b, c and d (FIG. 2) which are also identical with each other. Each carriage 18 comprises a framework 20 consisting of an upper and lower horizontal member 22 and 24 respectively, a vertical member 26 and an inclined member 28. Mounted on the upper member 22 are two groups of rollers 30 which run in guide rails 32 extending over the full length of the run-out table 14. The guide rails 32 are attached by hangers 34 to the lower beam 36 of a grider 38. Each of the four carriages 18a, b, c and d is supported and guided by a separate rail 32.

The carriages 18 have individual drives, each consisting of a power unit 40, a gear box 42 and a pulley 44, as well as a number of rollers 46, 48, 50 and 52 which are partly arranged at opposite ends of the beam 36. A cable 54 is driven by the pulley 44 and attached with its ends to two lugs 56 and 58 at opposite ends of the upper frame member 22.

A gripper unit 60 is detachably mounted on the lower frame member 24 of each carriage 18 the unit being substantially in the shape of a box which is open at opposite ends and has a top plate 62, a bottom plate 64 and two side plates 66. Projecting from the top plate 62 are two lugs 68 in the shape of an inverted L. These are suspended from and guided along corresponding projections 70 on the lower frame member 24. It will be thus seen that each gripper unit 60 can be slid sideways into and out of position with relation to its carriage 18. A spring-loaded pin 72 which enters an aperture in the top plate 62 serves to locate a gripper unit 60 with relation to its carriage 18.

Arranged inside in a unit 60 is a flap 74 which normally obstructs the passage therethrough. The flap is provided with two lateral extensions 76 through which a pin 78 passes which acts as a pivot for the flap 74. Attached by a further pivot pin 80 to the flap is a link-and-lever system 82 which is also pivoted at 84 to the gripper unit 60. A push rod 86 forms part of the link-and-lever system and is adapted to actuate a micro switch 88 mounted on the platen 10 of the press. When a carriage 18 is in a position adjacent to the platen an extruded article on entering a gripper unit 60 will strike the flap 74 and swing it into an inclined position and thereby actuate through the link-and-lever system 82 and the push rod 86 the micro switch 88.

Each gripper unit 60 is further provided with jaws for automatically gripping an extruded article upon its entry into the unit. The lower jaw is formed by the bottom plate 64 of the unit and is located immediately adjacent to the flap 74. The upper jaw 90 is in the shape of an enlargement at the end of an actuating rod 92. The rod consists of two parts 92' and 92" which are detachably connected together outside the gripper unit 60 by means of a pin 94. The two opposite ends of the two rod parts are provided with interengaging teeth. The rod 92 is urged downwards by means of a spring 98 which abuts with one end against a flange 100 on the upper rod part 92" and with the other end against a bracket 102 attached to the vertical member 26 of the carriage 18.

The top end of the rod part 92" is normally held in its elevated postions by a two-arm latch 104 which is pivoted at 106 to a bracket 107 on the vertical member 26 of the carriage 18. The lower arm of the latch 104 formed with a claw 108 arranged to engage the bottom of a collar 109 on the upper rod part 92" when the latter is in its raised position, this latch arm being urged into the locking position by a spring 110 connected to the lower arm of the latch and the vertical member 26 of the carriage 18. The lower surface of the claw 108 is chamfered so that the latch can be deflected into its unlocked position by the ascending rod part 92". The latch can be released by a plunger 111 actuated by an electric solenoid 112 mounted on the platen 10. The plunger is urged towards its retracted position by a spring not shown whilst the solenoid when energized moves the plunger into engagement with the upper arm of the latch.

Pivoted to the collar 109 of the rod part 92" at 113 is a lever 114 which extends through the carriage 18 and a considerable distance beyond. The lever carries at this free end a cam roller 116 adapted to co-operate with a cam 118 arranged at the far end of the girder 38. The cam consists essentially of an inclined surface 120. The lever 114 is also pivoted to the carriage 18 at 122. It will be apparent that the lever on striking the cam surface is forced down at its free end; the rear end of the lever is thus forced upwards and lifts thereby the actuating rod 92 against the pressure of its spring 98 so that the two jaws 64 and 90 in the gripper unit are separated from each other. This occurs at the end of the extrusion operation when the gripper unit has reached the far end of the run-out table.

Each carriage 18 is provided with a buffer 124 which is adapted to abut against an adjustable stop 126 mounted on the platen. In this way shocks on the carriage and gripper unit upon return into their starting position are absorber.

Each gripper unit is further provided with a stripper plate 130 which is attached to the lower rod part 92' by means of a slidable bracket 132 and a winged nut 134. The stripper plate 130 projects with its lower end slightly into the passageway between the two jaws 64 and 90.

At the start of an extrusion operation each gripper unit is positioned adjacent the platen 10 of the press, ready to receive an extruded article, with the actuating rod 92 locked by the latch 104 in the raised position, the flap 74 in the gripper unit in its vertical position and closing the outlet from the gripper unit, and the push rod 86 spaced apart from the plunger 111 of the micro switch 88, the contacts of which are normally held open by a spring.

The leading end of each extruded article when emerging from the tunnel 12 of the press enters the passageway in one of the gripper unit 60. The article passes between the upper jaw 90 and the lower jaw 64, and upon striking the flap 74 pivots the latter in its inclined position in which the flap does not obstruct the free exit of the extruded article from the unit 60. The flap 74 when pivoted moves the push rod 86 into engagement with the operating member of the micro switch 88. This operating member closes thereupon the contacts of the micro switch so as to energize an electric circuit. The circuit energizes the solenoid 112 and moves the plunger 111 into engagement with the upper arm of the latch 104. The plunger pivots the latch into the position in which its claw 108 disengages the actuating rod 92 which consequently can yield to the action of the spring 98 and moves downwards so as to approach the upper jaw 90 to the lower jaw 64. In this way the leading end of the extruded article is clamped firm in the gripper unit.

The carriage 18 begins now to travel along the run-out table 14 at the speed of the extruded article until the extrusion operation is completed. At the end of the operation, the carriage is held stationary by the article, despite the tractive effort of the power unit 40 which still exerts the same pull on it.

The extruded article is now separated from the discard as well known by such means as a saw built into the press whereupon the carriage begins to move again and accelerates to maximum speed pulling the article to the end of the run-out table.

During the final movement of the carriage 18, towards the end of the run-out table, the roller 116 on the lever 114 runs along the lower surface of the cam 118 and pivots the free end of the lever downwards. The rear end of the lever is thus forced upwards and lifts the actuating rod 92 so that the upper jaw 90 releases the extruded article. The actuating rod 92 is lifted by the action of the roller 116 into a position in which its end is above the claw 108 of the latch 104. The latter then pivots into its locking position under the action of its return spring 110 whereby the rod 92 is held in its raised position.

The stripper plate 130 on the unit 60 comes into operation in case an extruded article adheres to the upper jaw 90. In such a case the article entrained by the jaw is brought into engagement with the stripper plate which then prevents further upward movement of the article and thereby frees the jaw from the article and the jaw is raised above the front end of the stripper plate.

When the carriage 18 reaches the end of the run-out table 14 it trips a limit switch which energizes a circuit for applying a brake and stopping the power unit 40. The extruded articles can then be removed from the run-out table and the carriage is returned to the starting position adjacent to the platen of the press.

What I claim is:

1. An extrusion puller comprising at least one power-driven carriage movable along the runout table of an extrusion press, gripper means mounted on said carriage and adapted to grip an extruded article emerging from the die of the press, a longitudinally displaceable control rod displaceable along its axis for opening or closing said gripper means, spring means urging said rod towards said gripper means, a latch pivotally mounted on said carriage and arranged to engage said rod and to hold it in a position in which said rod opens said gripper means, a plunger adapted to engage said latch and move it out of engagement with said rod, and electro-magnetic control means for said plunger, said electro-magnetic control means being energizable in response to the insertion of the leading end of an extruded article into the gripper means.

2. An extrusion puller comprising at least one power-driven carriage movable along the runout table of an extrusion press, gripper means mounted on said carriage and adapted to grip an extruded article emerging from the die of the press, said gripper means comprising two jaws of which one can be moved towards or away from the other, a longitudinally displaceable control rod displaceable along its axis, said movable jaw being attached to one end of said rod, spring means urging said rod towards the other jaw, a latch pivotally mounted on said carriage and arranged to engage the opposite end of said rod and hold it in a retracted position with regard to the other jaw, a plunger adapted to engage said latch and to move it out of engagement with said rod, and electro-magnetic control means for said plunger, said electro-magnetic control means being energizable in response to the entry of the leading end of an extruded article between said jaws.

3. An extrusion puller comprising at least one power-driven carriage movable along the runout table of an extrusion press, gripper means mounter on said carriage and adapted to grip an extruded article emerging from the die of the press, a longitudinally displaceable control rod displaceable along its axis for opening or closing said gripper means, spring means urging said rod towards said gripper means, a latch pivotally mounted on said carriage and arranged to engage said rod and to hold it in a position in which said rod opens said gripper means, a plunger adapted to engage said latch and move it out of engagement with said rod, a flap adapted to be moved aside by the advance of an extruded articles on said runout table, and electro-magnetic control means operable in response to the insertion of the leading end of an extruded article into said gripper means, for releasing said latch by said plunger.

4. An extrusion puller comprising at least one power-driven carriage movable along the runout table of an extrusion press, gripper means mounted on said carriage and adapted to grip an extruded article emerging from the die of the press, a box shaped housing for said gripper means, a control rod, displaceable along its axis for opening or closing said gripper means, said rod extending into said housing, spring means urging said rod towards said gripper means, a latch pivotally mounted on said carriage and arranged to engage said rod and to hold it in a position in which said rod opens said gripper means, a plunger adapted to engage said latch and move it out of engagement with said rod, and electro-magnetic control means for said plunger, said electro-magnetic control means being energizable in response to the insertion of the leading end of an extruded article into the gripper means, said rod consisting of two separate longitudinal parts which are detachably coupled to each other outside said housing.

5. An extrusion puller comprising at least one power-driven carriage movable along the runout table of an extrusion press, gripper means mounted on said carriage and adapted to grip an extruded article emerging from the die of the press, said gripper means comprising two jaws of which one can be moved away from the other in a direction perpendicular to the movement of the extruded article on the runout table, a control rod, displaceable along its axis, said movable jaw being attached to one end of said rod, spring means urging said rod towards the other jaw, a latch pivotally mounted on said carriage and arranged to engage the opposite end of said rod and hold it in a retracted position with regard to the other jaw, a stripper plate arranged next to the path of the movable jaw and adapted to prevent adherence of an extruded article to the movable jaw on its retraction from the other jaw, a plunger adapted to engage said latch and to move it out of engagement with said rod, and electro-magnetic control means for said plunger, said electro-magnetic control means being energizable in response to the entry of the leading end of an extruded article between said jaws.

6. An extrusion puller comprising at least one power-driven carriage movable along the runout table of an extrusion press, gripper means mounted on said carriage and adapted to grip an extruded article emerging from the die of the press, a control rod, displaceable along its axis, for opening or closing said gripper means, spring means urging said rod towards said gripper means, a latch pivotally mounted on said carriage and arranged to engage said rod and to hold it in a position in which said rod opens said gripper means, a plunger adapted to engage said latch and move it out of engagement with said rod, electro-magnetic control means for said plunger, said electro-magnetic control means being energizable in response to the insertion of the leading end of an extruded article into the gripper means, and cam-actuated means for moving said rod against the action of said spring means when said carriage has arrived at the end of its travel along the runout table of the press.

References Cited by the Examiner

UNITED STATES PATENTS

| 2,914,170 | 11/1959 | Kent | 207—1.2 |
| 3,058,587 | 10/1962 | Smith | 207—1.2 |
| 3,116,831 | 1/1964 | Harwood et al. | 207—1.2 |
| 3,116,832 | 1/1964 | Pieron et al. | 207—1.3 |
| 3,118,539 | 1/1964 | Harwood et al. | 207—1.2 |

FOREIGN PATENTS

| 840,061 | 7/1960 | Great Britain. |

CHARLES W. LANHAM, *Primary Examiner.*

MICHAEL V. BRINDISI, *Examiner.*